Aug. 6, 1929.  H. D. COLMAN  1,723,681
GASOLINE GAUGE
Filed Sept. 24, 1924   2 Sheets-Sheet 2

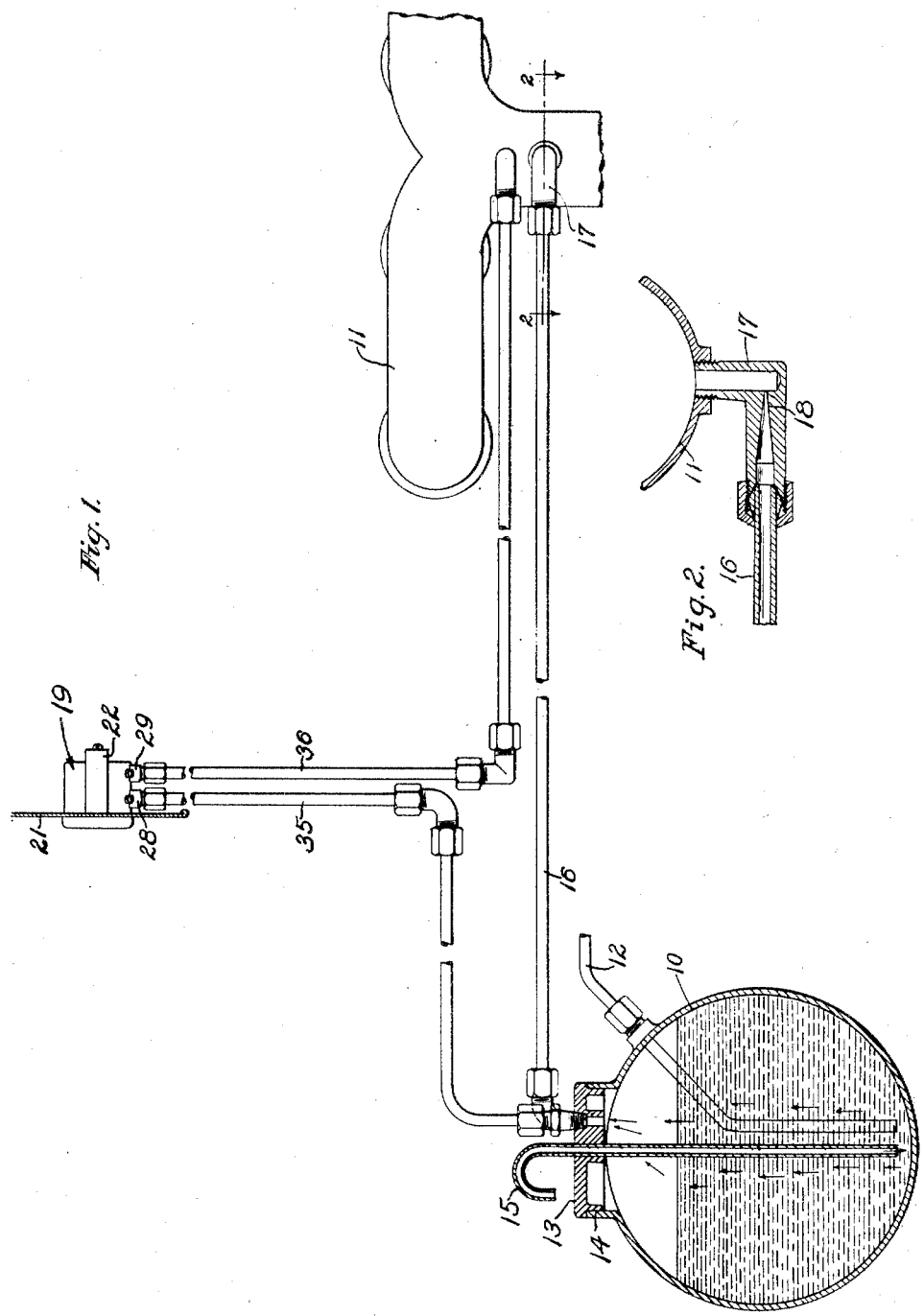

Inventor:
Howard D. Colman
By Churchill Parker Carlson
Attys.

Patented Aug. 6, 1929.

1,723,681

UNITED STATES PATENT OFFICE.

HOWARD D. COLMAN, OF ROCKFORD, ILLINOIS, ASSIGNOR TO BARBER-COLMAN COMPANY, OF ROCKFORD, ILLINOIS, A CORPORATION OF ILLINOIS.

GASOLINE GAUGE.

Application filed September 24, 1924. Serial No. 739,465.

The invention relates to improvement in gauges for measuring changes in volumes of liquids, and has particular reference to gasoline gauges which are adapted for use on automobiles to indicate at all times the volume of gasoline in the fuel tank.

The invention contemplates the use of an air-tight fuel tank from which the flow of a small stream of air is continually induced by any suitable suction means such as the intake manifold of an internal combustion engine, and to which air is gradually admitted in such amounts as will maintain the internal pressure above the fuel proportional at all times to the level of the latter. The level of the fuel is indicated by a suitable pressure gauge connected to the tank. It will be evident that the above proportion will be maintained only when the suction means, the intake manifold in the present instance, is effectual, and that when the engine stops running the pressure in the tank due to air leakage will gradually become atmospheric, thus rendering the gauge ineffectual to indicate the level of fuel in the tank during such idle periods.

The primary object of the present invention, therefore, is to provide a novel and improved gauge which will at all times indicate the level of the fuel or liquid in the tank, irrespective of whether the engine is running or not.

A specific object is to provide a liquid measuring gauge of the above character having an indicating device which comprises one means connected to the fuel tank to register the pressure therein and thereby the level of the fuel, and another means connected to a suction means, said other means when permitted by the suction means serving to lock the indicator in a position corresponding to the level of the fuel.

A further object is to provide a novel and improved pressure indicating device for a gauge of the above type, which device comprises a brake for holding the indicator in a final position corresponding to the level of the liquid in the tank when the gauge becomes inoperable.

Ancillary objects and advantages will become apparent as the description proceeds.

Referring to the drawings, Figure 1 is a view of a gauge constructed according to my invention, and operatively connected to the fuel tank and intake manifold of a motor vehicle.

Fig. 2 is a section taken along line 2—2 of Fig. 1.

Figure 3:
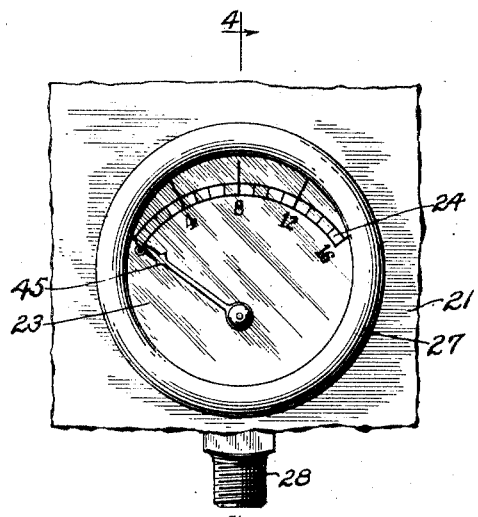
Fig. 3 is a front view of the indicating device for the gauge.
Figure 4:
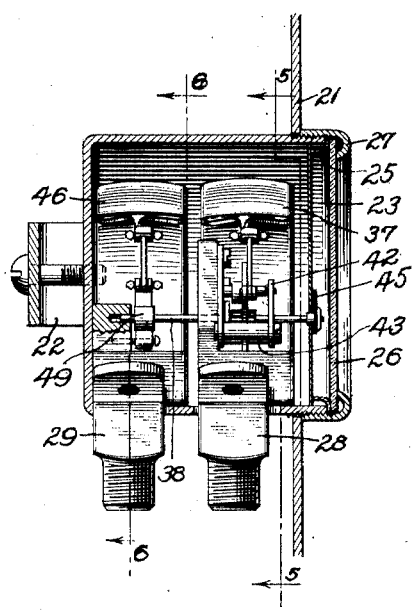
Fig. 4 is a longitudinal sectional view through the casing of the indicating device taken along line 4—4 of Fig. 3, and showing the operating mechanism side elevation.
Figure 5:
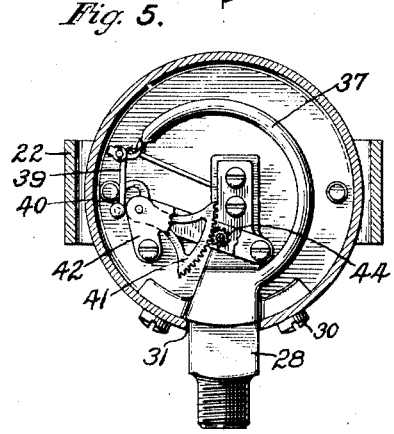
Fig. 5 is a sectional view taken along line 5—5 of Fig. 4.
Figure 6:
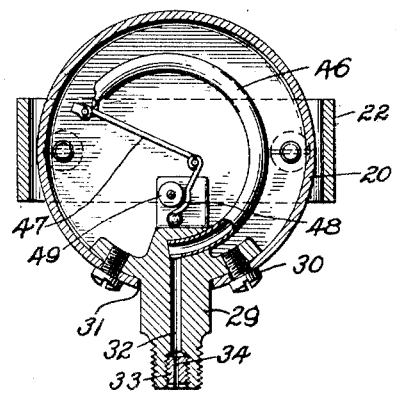
Fig. 6 is a sectional view taken along line 6—6 of Fig. 4.

While my invention is susceptible of various modifications and alternative constructions, I have shown in the drawings and will herein describe in detail the preferred embodiment, but it is to be understood that I do not thereby intend to limit the invention to the specific form disclosed but aim in the appended claims to cover all modifications and alternative constructions falling within the spirit and scope of the invention.

In the exemplary embodiment illustrated in the drawings, 10 represents an air-tight fuel tank for an automobile, and 11 indicates the intake manifold of an internal combustion engine. Fuel is removed from the tank through a suitable feed pipe 12 which leads to the engine carburetor (not shown).

The fuel tank 10 is closed by a removable cap 13 which fits tightly into the opening 14. A venting tube 15 bent downwardly at its outer end to prevent the entrance of foreign matter extends through the cap 13 into the tank 10 to a point near the bottom thereof, and serves to admit air to the tank as fuel is withdrawn. Connecting the tank 10 with the intake manifold 11 is a pipe 16 which serves to conduct a small stream of air from the tank when a vacuum is induced in the intake manifold 11. This pipe is connected to the intake manifold 11 by an elbow 17 having a restricted opening 18 which limits and prevents sudden fluctuations in the flow of air. It will be evident that the pressure in the tank 10 will always be proportional to the varying level of fuel as the latter is consumed and more specifically will equal atmospheric pressure minus the weight of the column of liquid in the tube 15. If the pressure is too high air will be withdrawn through the pipe 16 without being replaced until the correct value is obtained. As fuel and air are withdrawn through the pipes 12 and 16 respectively, air from the tube 15 will bubble up through the fuel as indicated by the arrows to adjust the pressure and maintain it at the value corresponding to the volume of fuel present. Exhausting air through the pipe 16 serves to prevent the pressure from rising above the proper value which would otherwise result due to air leakage into the tank, and also to quickly lower the pressure from atmospheric pressure after filling the tank or after the engine has been idle for some time.

Means is provided for accurately indicating the pressure in the tank 10. This means includes a suitable indicating device 19 which can be supported in the dash of the automobile, and which in the present instance, comprises a cylindrical casing 20. The casing 20 extends through the dash 21 and is suitably supported by a bracket 22.

A dial 23 having suitable graduations 24 is mounted in the front end of the casing 20, and is held in position by an integral annular flange 25 fitting over the front edge of the casing. The dial 23 is protected by a glass 26 spaced therefrom by the flange 25 and clamped in place by a flange ring 27 threaded onto the front end of the casing 20.

A pair of spaced heads 28 and 29 are secured in the casing 20 by screws 30, and extend outwardly therefrom through holes 31. Each head is formed with a central passage 32 into the outer end of which a plug or nozzle 33 having a restricted throttle passage 34 is threaded. Pipe lines 35 and 36 are threaded onto the outer ends of the heads 28 and 29 respectively, and serve to connect the passages 32 with the tank 10 and intake manifold 11 respectively.

Supported by the head 28 in communication with the low vacuum pipe line 35 is a Bourdon tube 37. The free end of this tube is operatively connected by a suitable mechanism to a spindle 38 journaled in the heads 28 and 29, and extending through the dial 23. In the present instance, this mechanism comprises a link 39 which is pivotally connected to the tube 37 and to a curved arm 40 formed on a gear segment 41. The latter is pivotally mounted between two frame members 42 connected by spacers 43 and supported by the head 28, and meshes with a pinion 44 on the spindle 38. A pointer or indicator 45 is mounted on the front end of the spindle 38, and is adapted to move over the graduations 24 to indicate the pressure and hence the fuel level in the tank 10.

It will be evident that the pointer 45 will accurately indicate the level of the fuel in the tank when a pressure corresponding to that level is maintained. When the engine is idle, and no vacuum is induced in the intake manifold 11, the pressure in the tank will however gradually rise to that of the atmosphere due to air leakage and other causes, and will not correctly represent the level of the fuel.

To obtain correct readings at all times, means is provided for locking the pointer 45 in a position corresponding to the final level of the fuel when the engine is not running, and the vacuum in the intake manifold 11 is destroyed. This means comprises a second Bourdon tube 46 mounted on the head 29 in communication with the high vacuum pipe line 36. The free end of the tube 46 is connected by a link 47 to a curved brake lever 48 pivotally mounted on the head 29 and positioned to frictionally engage a hub 49 on the spindle 38. When the vacuum in the manifold 11 is destroyed, the tube 46 will move the lever 48 against the hub 49 to hold the pointer 45 in place. Since the return to atmospheric pressure in the tank 10 takes place slowly and for some time after the engine is stopped, the pointer 45 will be locked in a position correctly representing the level of the fuel.

In operation, when there is a vacuum in the intake manifold 11, gasoline will be withdrawn from the tank 10 through the feed pipe 12, and a small stream of air will flow from the tank through the pipe 16. Sudden fluctuations in this flow of air are prevented by the restricted opening 18. If the vacuum has just been induced, the pressure in the space above the liquid in the tank 10 is gradually exhausted until the sum of this pressure plus the weight of a column of liquid equal to the space in the tube 15, equals atmospheric pressure. If the internal pressure of the tank is further reduced, air will flow in through the tube 15. Since there is a constant flow of air through the pipe 16 there is also a constant flow of air through the tube 15 to maintain the pressure in the tank at all times proportional to the volume of liquid therein. The internal pressure of the tank is measured by the indicating device comprising the pointer 45.

If the vacuum in the intake manifold 11 is destroyed, the pressure in the tank will gradually rise to atmospheric pressure because of leakage. The locking mechanism, however, is also rendered operative by the destruction of the vacuum in the intake manifold 11, and serves to hold the pointer 45 in the position indicating the correct volume of gasoline in the tank 10 without regard to the pressure. Upon again inducing a vacuum in the intake manifold 11 the locking mechanism is released, and the pointer 45 is again subject to the pressure in the tank 10.

I claim as my invention:

1. A gauging system having in combination with a closed fuel tank and the intake manifold of an internal combustion engine, a venting tube for admitting air to said tank at a point in the liquid at the minimum level to be gauged, a pipe connecting said tank to said intake manifold, suction in said manifold being adapted to induce a flow of air from said tank so as to maintain a pressure in the latter proportional to the level of the liquid, an indicating device having a pressure responsive indicating mechanism and a pressure responsive brake mechanism for said indicating mechanism, a pressure line connecting said indicating mechanism and said tank, and a pressure line connecting said brake mechanism and said intake manifold, said brake mechanism being operable to hold said indicating mechanism in its final reading when the vacuum in said intake manifold is destroyed.

2. A gauging system having in combination with a closed tank and a suction means adapted to be operable or inoperable, vent means for admitting air to said tank at the minimum level of the liquid to be gauged, means connecting said suction means to said tank, the suction from said suction means when operable tending to maintain the pressure in said tank proportional to the level of the liquid, a Bourdon tube, a pressure line connecting said Bourdon tube to said tank, an indicator means operable by said tube to indicate the pressure in said tank, a second Bourdon tube, a brake mechanism for said indicator means operable by said second tube, said second tube when being exhausted tending to release said brake mechanism and when not exhausted applying said brake mechanism, and a pressure line connecting said second tube to said suction means.

3. A gauging system having in combination with a closed tank, means for maintaining the pressure in said tank proportional to the level of the liquid therein, said means being adapted to be operable or inoperable, an indicator, a pressure responsive device for actuating said indicator, means operatively connecting said device to said tank, a locking means for said indicator, a pressure responsive device for operating said locking means, said last mentioned pressure responsive device tending upon a reduction in pressure to release said locking means, and tending upon an increase in pressure to apply said locking means, and a pressure line connecting said last mentioned pressure responsive device to said first mentioned means, whereby when said first mentioned means is operable said locking means will be released and when first mentioned means is inoperable said locking means will be applied.

4. A gauging system having in combination with a closed fuel tank, a suction means adapted to be operable or inoperable, a venting tube for admitting air to said tank at a point in the liquid at the minimum level to be gauged, means connecting the interior of said tank to said means, suction from said means being adapted to induce a flow of air from said tank so as to maintain a pressure in the latter proportional to the level of the liquid in the tank, an indicating device having a pressure responsive indicating mechanism and a pressure responsive brake mechanism, a pressure line connecting said indicating mechanism and said tank, and a pressure line connecting said brake mechanism and said first mentioned means, said brake mechanism being operable to hold said indicating mechanism in its final reading when the suction in said first mentioned means is destroyed.

5. A gauging system having in combination with a closed tank and a suction means adapted to be operable or inoperable, vent means for admitting air to said tank at the minimum level of the liquid to be gauged, means connecting said suction means to said tank, the suction from said suction means when operable tending to maintain the pressure in said tank proportional to the level of the liquid, means for restricting the flow of air through said last mentioned means, a Bourdon tube, a pressure line connecting said Bourdon tube to said tank, an indicator means operable by said tube to indicate the pressure in said tank, a second Bourdon tube, a brake mechanism for said indicator means operable by said second tube, said second tube when being exhausted tending to release said brake mechanism and when not exhausted applying said brake mechanism, and a pressure line connecting said second tube to said suction means.

6. A gauging system having in combination with a closed tank, vent means for admitting air to said tank at a point in the liquid at the minimum level to be gauged, a pressure indicating mechanism, a suction means adapted to be operable or inoperable, means connecting said indicating mechanism and said suction means to the interior of said tank, said suction means when in operation serving to maintain the pressure in said tank proportional to the level of the liquid therein, means for restricting the flow of air to said suction means, a braking means for said indicating mechanism, and means connecting said braking means to said suction means, said braking means being adapted to release said indicating mechanism when said suction means is in operation, and to brake said indicating mechanism when said suction means is not in operation.

7. A gauging system having in combination with a closed tank adapted to contain liquid, vent means for admitting air to said tank at a point in the liquid at the minimum level to be gauged, a suction means adapted to be operable or inoperable, an indicating mechanism, a braking mechanism for said indicating mechanism, and pressure lines connecting said suction means to said tank and to said braking mechanism, and connecting said indicating mechanism to said tank, said braking mechanism being ineffective when said suction means is in operation and being effective when said suction means is not in operation.

8. A gauging system having in combination with a closed tank, vent means for admitting air to said tank at a point in the liquid at the minimum level to be gauged, a suction means communicating with the top of the interior of said tank and adapted to be operable or inoperable, a pressure responsive indicating mechanism communicating with the top of the interior of said tank and subject to fluctuation in the pressure in said tank, and a pressure responsive braking mechanism communicating with said suction means and subject to the action of said suction means and effective to brake said indicating mechanism when said suction means is not in operation.

In testimony whereof, I have hereunto affixed my signature.

HOWARD D. COLMAN.